April 15, 1930.   D. D. GOLDBERG   1,754,424
VALVE MECHANISM
Filed May 22, 1926   4 Sheets-Sheet 1

David D. Goldberg
INVENTOR.
BY
H. E. Golber
ATTORNEY.

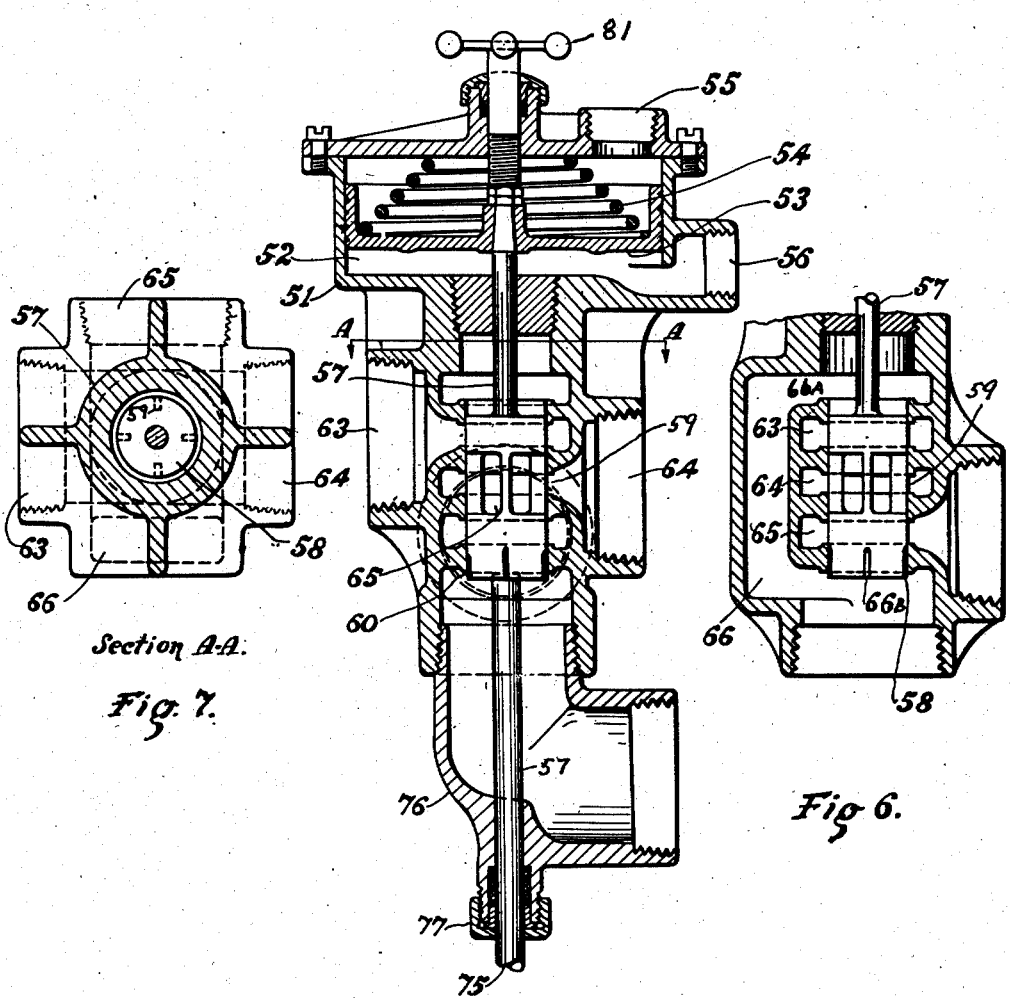

April 15, 1930.   D. D. GOLDBERG   1,754,424
VALVE MECHANISM
Filed May 22, 1926   4 Sheets-Sheet 4

David D. Goldberg
INVENTOR.

BY H. E. Golber
ATTORNEY.

Patented Apr. 15, 1930

1,754,424

UNITED STATES PATENT OFFICE

DAVID D. GOLDBERG, OF CHICAGO, ILLINOIS

VALVE MECHANISM

Application filed May 22, 1926. Serial No. 110,979.

In many fluid supply systems, it is necessary to use various kinds of automatic valves. Some of these valves are shut-off valves, others are check valves, and still others are combination shut-off-and-check valves. Of these valves, many are operated directly by the pressure of the fluid in the system, some are operated indirectly by the fluid pressure, and others by power furnished from other sources; for instance, by an electric motor. One application of such valves is to steam boiler equipment, to prevent an undesirable back flow of steam from a common header into a boiler under lower steam pressure. Another application is to water works to prevent the bleeding of a water main in case of a break therein. A third application is in connection with centrifugal pumps to prevent an undesirable back flow in case the pump pressure decreases below a predetermined point. Lately, new applications have been made in connection with water storage systems, and with filtration plants. The field for such valves is rapidly increasing.

While the general principles of valve construction are the same for all fluids, whether gases or liquids, still account must be taken of the specific requirements in each field. Thus valves for gases are more difficult to keep tight than those for liquids. Again in valves for liquids objectionable phenomena known as water hammer frequently occur. In some large water works, this water hammer was so violent as to threaten to wreck the equipment. This water hammer occurs frequently with unbalanced valves. These sometimes shut with a bang, which is dangerous enough in itself, but often surges are set up in the supply system which result in a series of dangerous bangs. Various remedies for these unsatisfactory conditions have been tried, some of which are described below.

Surges have been overcome by the use of surge tanks. But surge tanks are expensive and take up room which in some cases cannot be spared. It has been felt that the proper cure is not to offset the surge after it occurs, but to prevent its birth.

Attempts have been made to operate the valves not directly by the water pressure in the pipe but by some other means. Valves with auxiliary means for forcibly opening and closing, say a large check valve, have been made, but the bang and surge still exist, due to the backlash of the parts of the mechanism, and therefore incomplete control. Other attempts have been made to slow down the final portion of the closing motion of the valve, but in check valves, trouble is here encountered due to the difficulty of accurate external control.

More successful solutions are those where the closing member was made to move not parallel to or along the current, as in a check valve, but perpendicularly thereto or across it, as in gate valves. But even in gate valves, as constructed, it is found that they are subject to an annoying chatter when partially open. This is due to the fact that the gate itself is at that moment but loosely supported. Gate valves do not solve the problems.

I claim that I have solved the above problems by my invention, one feature of which is that in my valve the closing member is always rigidly supported, thus preventing chatter; second, that it is perfectly balanced against the fluid pressure, thus preventing surges, and third, that the final shut off is gradually slowed down, thus tremendously reducing water hammer.

Other troubles exist in fluid systems. Thus in the water works of a large city, they have discovered that the loss of head in a butterfly valve sometimes runs as high as 10%, which of course makes the supplying of the water so much the more expensive. It has been found that any departure from the straight continuous water pipe results in a loss of head. Butterfly valves are particularly objectionable, because they place an obstruction in the path of the water. But even gate valves which do not place any such obstruction in the clear path are objectionable because they introduce whirls and eddies.

I claim that I have solved the above trouble by my invention in which the valve is so constructed that when open the passage thru it is practically a continuous smooth tube of the same construction as a piece of smooth pipe. A fourth feature of my inven- tion is therefore the fact that all crossway obstructions have been removed, and a fifth feature is that whirls and eddies have been eliminated by keeping the passage a practically continuous smooth tube.

It is now some years since I first noticed that corporation cocks although used in tremendous numbers have never been constructed for large pipes. In fact, the largest corporation cock that one of the largest firms in that line builds is for an 8-inch pipe, while the same firm builds gate valves for pipe unlimited in diameter. Upon investigation it was established that this was due to the fact that in a large size corporation cock the friction is so great that it required so much power to operate it that it was found inadvisable to build them beyond the 8-inch size.

The corporation cock, however, seemed to me to have possibilities in it. It is balanced and it forms a continuous smooth passage when open. I therefore modified the corporation cock to preserve the balancedness and continuity of passage, but to lessen the force of the friction. This I accomplished by providing means for first forcing or lifting the conical plug away from its seat to remove the friction, and then to turn the now freely moving plug about the axis to open the passage. This lifting of the plug from the seat however resulted in the fact that the plug was no longer supported by the seat as in corporation cocks. I was therefore compelled to provide other means for supporting the plug while it was not on its seat. The final result is an improved valve which has novel and highly desirable features.

I immediately adapted my new valve for automatic operation. For this I invented novel valve operating mechanism for opening and closing the valve, and also controlling mechanism for the operating mechanism. These, however, will be more easily understood by referring to the drawings of which Fig. 1 shows a sectional view of the opened valve taken along a plane passing through the pipe axis and at right angles to the axis of rotation of the plug.

Figs. 5, 6 and 7 show a novel control for automatically controlling the operation of the valve. Fig. 5 shows one sectional view; Fig. 6 another sectional view at right angles to that of Fig. 5; Fig. 7 shows a view, partly in section, at right angles to the other two.

Figure 8:
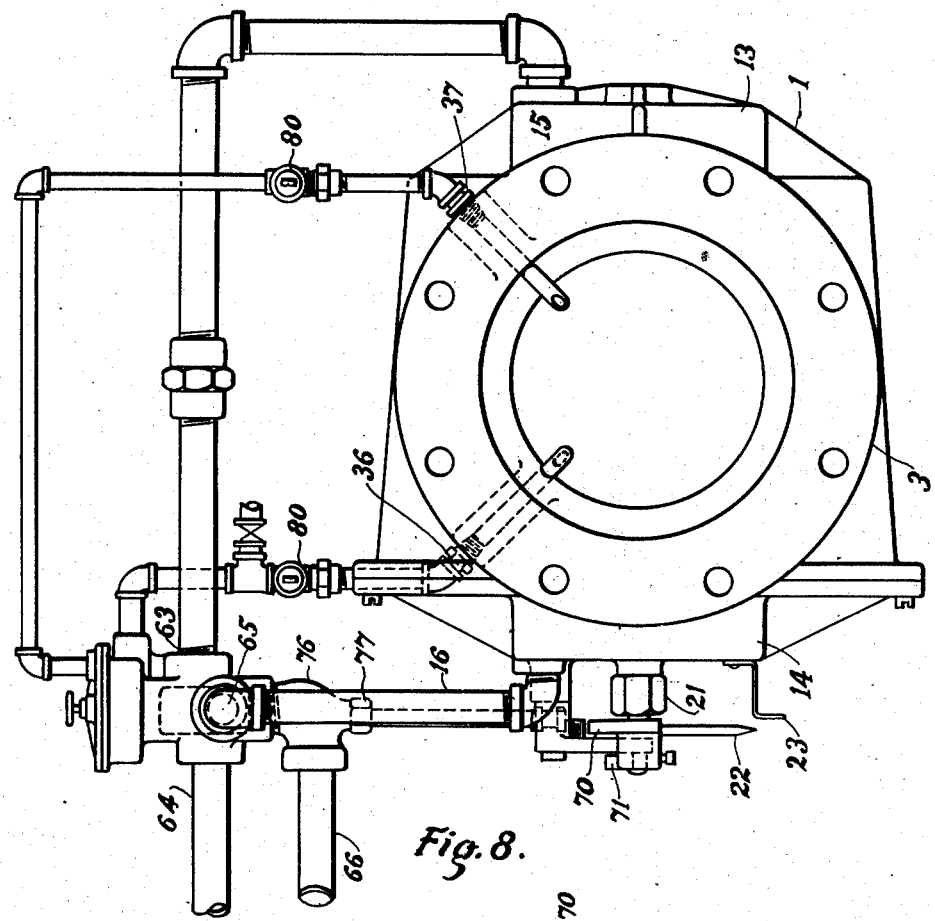

Fig. 8 shows an installation of a valve, its control and connections.

Figure 9:
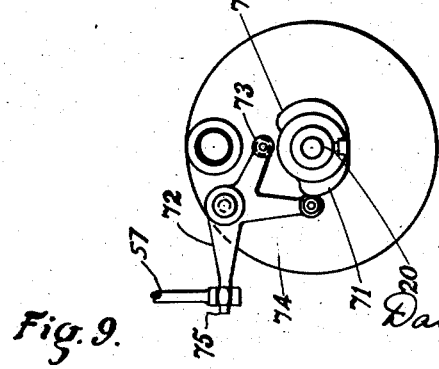

Fig. 9 shows an adjustable cam to predetermine the position to which the valve will be partially opened automatically.

The large valve, or, simply, valve, has a casing 1, (Figs. 1 and 2), provided with two flanges 2 and 3 for bolting it to the adjacent pipe sections. The casing 1 has a conical socket 4 and two cylinders 5 and 6, the socket and the two cylinders having a common axis perpendicular to axis of the pipe. Mounted in the casing is the plug 7 provided with a cone 8 and the two pistons 9 and 10, 8 and 9 and 10 having a common axis. The piston 9 always fits cylinder 5; the piston 10 always fits cylinder 6; and when the valve is tightly closed, cone 8 is snugly seated in the socket 4. To completely open the valve, the plug is moved axially to lift the cone from contact with the socket and then rotated about the axis through a quarter turn. While in this completely open position, the passage 11 in the casing is in complete alinement with the passage 12 through the plug, and almost continuous. It is true that there is a slight gap between the edge of the tapered passage 11 and the adjacent edge of the tapered passage 12 through the plug, but the gap is exceedingly small and for all practical purposes negligible.

Attention is called to the fact that while the valve is closed the plug is firmly supported by the pistons and cone, and that while it is completely or partially open it is still firmly supported by the pistons. There is no looseness for chattering. Moreover the valve is completely balanced, the water pressure having no tendency to move the plug. Moreover, while closing, the communicating area of the passages 11 and 12 diminishes from two coincident circles to the segment common to two intersecting circles and finally and gradually to nothing.

The plug may be lifted and opened, or closed and seated, in any desirable manner. I show two, one by rigid parts, the other hydraulic. For the latter method, the cylinders 5 and 6 are provided with ends 13 and 14 respectively, and the pipe openings 15 and 16. A fluid, for instance water, forced into the opening 15 will lift the valve plug, while water forced into the opening 16 will seat the valve plug. To provide mechanism for opening and closing the valve, the plug is provided with a steep pitch screw 17 coaxial with the pistons, while the casing is provided with a cooperating steep pitch nut 18, coaxial with the cylinders. The pitch angle may vary. A movement of the plug axially results in a rotation about that axis and therefore in opening or closing the valve as desired.

In order that the lifting of the plug may precede its opening, the screw and nut are intentionally cut with some backlash. When lifting axial movement is applied, first the backlash is taken up, then as the screw metal strikes the nut metal, the screw commences to turn and to open the plug. Reversely, when the plug is moving axially to close, the pressure upon it keeps its screw advanced in the nut, but upon the cone contacting with the socket that advance is checked, and the backlash thus introduced. But even if there were no backlash whatever between the nut and the screw, the mechanism would still work efficiently except that the force required at the initial moment of lifting might be greater.

Figure 2:
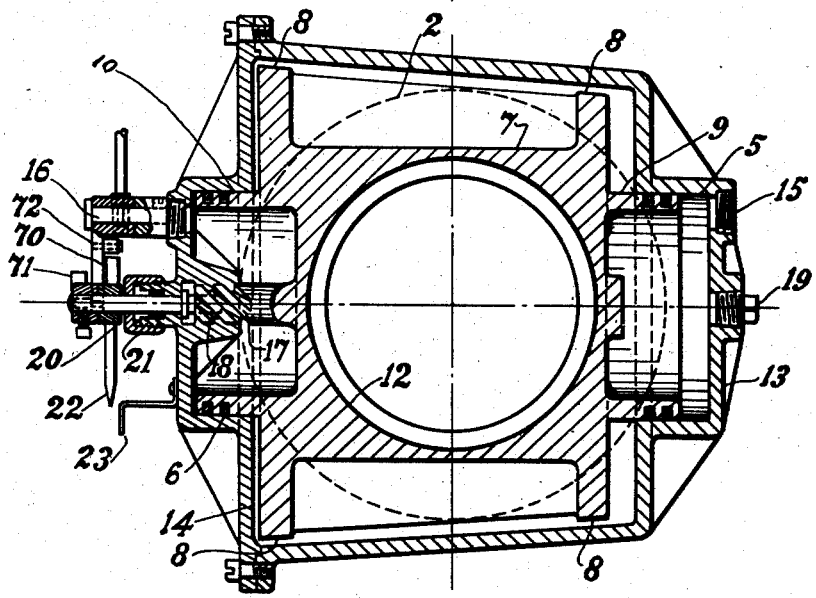
Fig. 2 shows a view, partly in section, of the opened valve taken along a plane through the axis of rotation of the plug and at right angles to the axis of the pipe.

Fig. 2 shows piston rings, for greater tightness, and a plug 19, which may be removed so that a bar could be introduced for forcibly lifting the valve plug in case there is no water pressure. In large size valves the whole end 13 is made removable. The end 14 is shown as removable for the introduction of the valve plug and other mechanism.

Theoretically, the water pressure through 15 will open the valve, the water pressure through 16 will close the valve. But in practice there may be no water pressure and the operator may wish to know the actual position of the plug. To furnish him that information, the screw is provided with an extension rod 20 passing through a stuffing box 21. This rod is provided with a hand 22 passing over a dial 23 mounted on 14. While the rod 20 could be rigidly fastened to the screw 17, it is preferred to simply key them together, so that they rotate together, but rod 20 does not slide axially.

Figure 3:
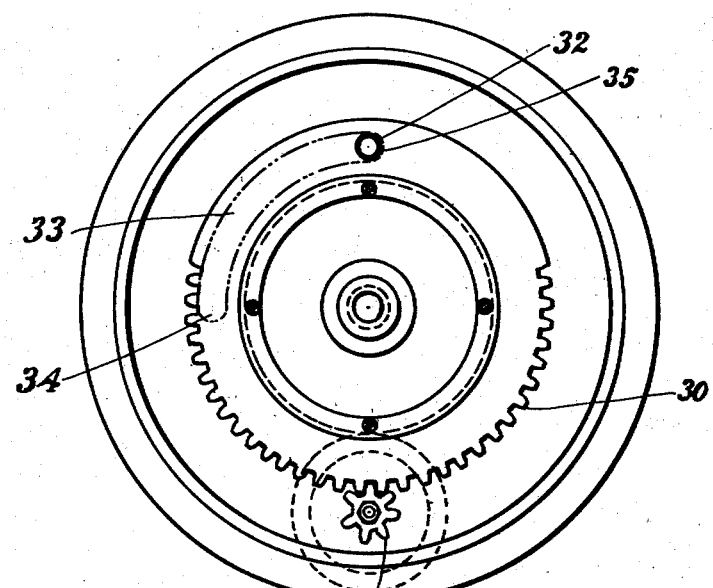
Figs. 3 and 4 show two views of means for manually operating the valve.
Figure 4:
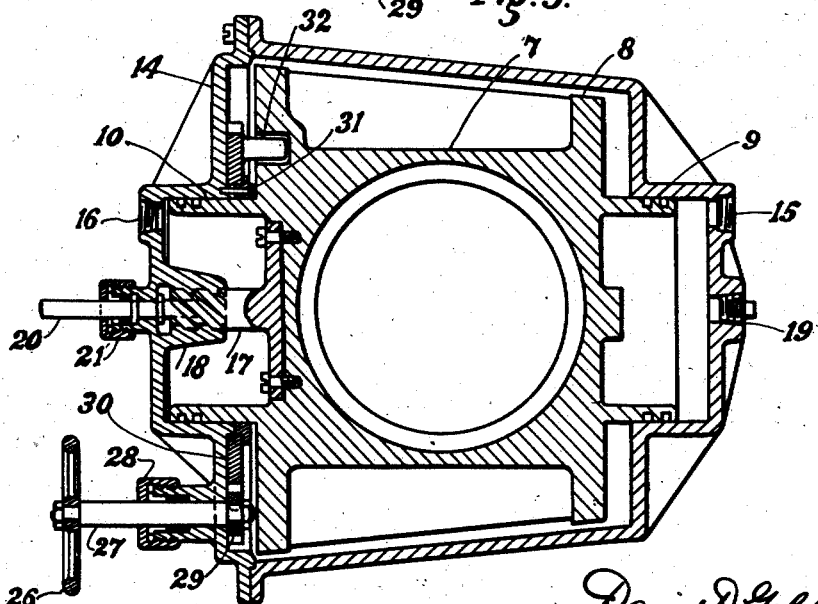

Figs. 3 and 4 show means for operating the valve by hand. There is provided a hand wheel 26, mounted on a shaft 27, passing through a stuffing box 28, mounted on 14. The shaft has mounted on it a pinion 29, gearing with a ring 30, rotatably mounted on a journal, 31. The ring gear carries a pin 32, extending into a quadrantal groove 33 of the valve plug and having the ends 34 and 35. The shaft 27 can be located and locked in any desired place in any desired manner, for instance by tightening the stuffing box 28 or by a pawl and ratchet (not shown).

When the valve is closed, the rotation of the hand wheel in the proper direction will turn the ring gear, and bring the pin 32 against the groove end. Further rotation will force the plug to rotate and therefore to open. A reverse rotation of the hand wheel will first remove the plug from the previous groove end and it will take a quarter turn of the ring gear to bring the pin into contact with the opposite end of the groove, and a still further quarter turn to completely move the plug to close. Should it be desired to now prepare the valve for hydraulic operation the ring gear must be given a quarter turn in the opposite direction.

The reason why 33 is made a quadrantal groove rather than a round hole embracing the pin 32, is that in actual practice the operation of the valve is almost always hydraulic, and the hand or ring gear operation is exceedingly rare. Rapidity of operation of the gear mechanism is of but little importance. Some firms in fact prefer the valve without the gear mechanism. In case of a failure of the water supply, they attach hand pumps to the openings 15 and 16 and operate the valve hydraulically.

An examination of Figs. 1, 2, 3, and 4 shows that the passages 11 and 12 are tapered, instead of being of constant diameter. This is simply to illustrate possibilities. Many centrifugal pumps have an outlet of increasing diameter and for saving room and attaching the valve directly or close to the pump, the passage through the valve may be given the proper taper.

Figure 1:
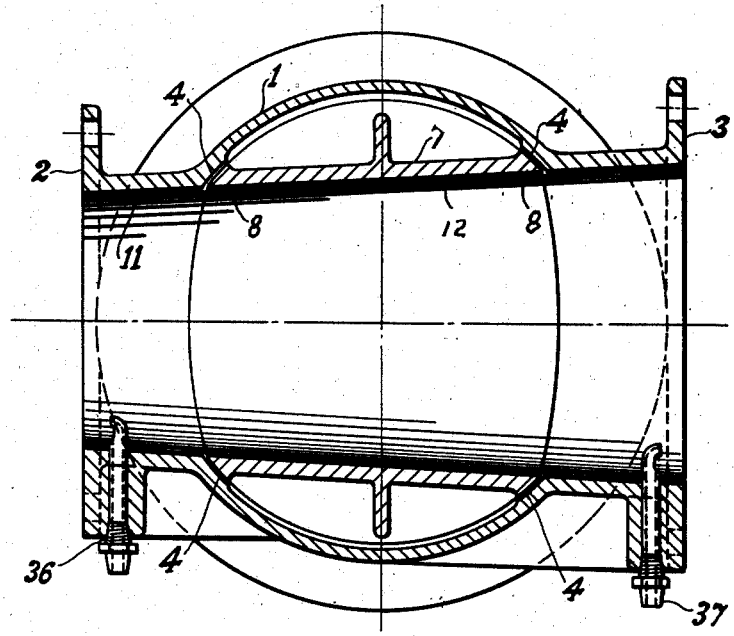

Fig. 1 shows that in the valve neither the surface of the cone nor that of the socket in the casing is continuous. This is because it is unnecessary to make the surfaces complete. These seat surfaces are ordinarily made of bronze, and bronze is very expensive. These surfaces are therefore made as large as need be and as much is saved as possible. In the smaller size valves the whole valve is bronze and the seats are cast continuous.

While the exact position of the plug in the closed position may vary within rather wide limits, the position of the plug when the valve is completely open cannot vary without harm. A stop is therefore provided to end the rotational movement. The pin 32 serves as such a stop.

Ordinarily the valve is operated automatically. Water pressure or a velocity head on one side of the valve beyond a predetermined amount or a difference between the water pressures or velocity heads on the two sides of the valve beyond a predetermined amount controls the mechanism. The pressures are determined by means or piezometers or Pitot tubes, 36 and 37, (Fig. 1) shows two Pitot tubes as installed.

Large valves provided with small control valves are well known. I have however invented a control valve which I consider superior to any I am acquainted with. My invention illustrated particularly in Figs. 5, 6 and 7 is a four-way balanced control valve. Fig. 5 shows a longitudinal section through the valve. Fig. 6 shows another longitudinal section of a part of the valve but at right angles to that of Fig. 5. Fig. 7 shows a view at right angles to those of Figs. 5 and 6.

The control valve has a casing 51 in which is formed a cylinder 52. Sliding in this cylinder 52 is the control valve piston 53, upon which rests a spring 54 of predetermined force. There is an opening 55 above the piston and another opening 56 below the piston, passage 56 being piped to one Pitot tube, opening 55 to the other. The position of the piston 53 is thus determined by the pressures or velocity heads at the ends of the big valve, and the force of the spring 54.

Extending from the piston 53 is a rod 57 which expands into a cylindrical portion 58, which at its central portion has the material removed leaving only a four pillared portion 59 so that the water may freely pass between. The lower portion has some shallow grooves 60 cut therein.

The control valve casing 51 is provided with five chambers in a row 66A, 63, 64, 65 and 66B. Each chamber is a flat space surrounding the cylindrical portion 58. 64 is in the center and has an opening therefrom at right angles to the axis. 63 is above 64, 65 is below 64, and each has an opening therefrom at right angles to the axis and at right angles to the opening 63; this is simply for accessibility for piping. The chamber 66A is above 63, the chamber 66B is below 65. But 66A and 66B are united forming one chamber 66, which is thus both above 63 and below 65. There is no communication between the chambers except through the cylindrical hole filled by the cylinder 58.

Starting with say 65, we find adjacent to it the chamber 64. Adjacent on the other side of 64 is the chamber 63. Adjacent on the other side of 63 is the chamber 66A, that is 66. Adjacent on the other side of 66 or rather 66B is the chamber 65. This completes a cycle. Always going from one to the next adjacent chamber we thus find 65, 64, 63, 66, 65, 64, 63, 66, etc. The four chambers thus form a cycle, of four chambers adjacent in a cycle, and which may be considered as composed of two pairs, each pair being separated from the other pair. Thus 66 and 64 are one pair, 63 and 65 are the other pair. Any chamber is adjacent to both chambers of the other pair, and may be put in communication with each of them, but not with both simultaneously. No chamber can be put in communication with the other one of its own pair. 64 is a power water inlet. Where that water comes from is of no importance. It may come from the system or a special supply. 66 is the waste water outlet leading to the atmosphere. 63 is connected to 15, 65 to 16.

Please recall that water into 15 and out of 16 opens the big valve, while water into 16 and out of 15 closes the big valve.

With the cylinder 58 as in position Figs. 5 and 6, 64 the power is shut off from both 63 and 65, and 66 the outlet is also cut off from both. The water in both 63 and 65 is thus completely trapped and the big valve is thus hydraulically locked in position, whatever that position may be.

When the cylinder 58 is in a lower position, 63 is then open to 66, and 65 open to 64. The valve opening water is thus discharging, and the valve closing water is entering. The big valve then closes. When the cylinder 58 is in its upper position 63 is then open to 64 and 65 to 66. The valve opening water is entering, the valve closing water issuing. The big valve then opens.

The upper position of the cylinder 58 thus controls the big valve to open, the middle position to lock, the lower position to close. And this it does by controlling both cylinders of the big valve. There is thus no balancing or overcoming of pressures. The whole of the power of the power water is effective.

Notice that the spring 54 tends to push the cylinder 58 down, that is it tends to close the big valve. The tendency to close is thus favored. If it is desired to favor the tendency to open, the pipe connections 63 and 65 would be interchanged.

In actual practice it is very important to close very speedily, but it is advisable to open slowly. This is accomplished by making the cylinder 58 so long on its lower end that it really never opens 65, the big valve-closing passage, to the waste outlet 66B except through the shallow grooves 60. The valve closing water therefore escapes but slowly, the valve opening water therefore enters slowly, the valve therefore opens slowly. In closing, however, 63 is in complete and open communication with 66A, and 65 with 64. The valve opening water escapes and the valve closing water enters and both speedily, which was desired.

Sometimes the chamber 66 is made with two openings each leading to the atmosphere or discharge. But this is simply a convenience. The whole atmosphere may be considered one chamber with chamber 66.

It sometimes is desired to open the big valve automatically only a predetermined limited amount, without interfering with its complete automatic closing when necessary. Mechanism has been provided therefor. On the rod 20 two cams are mounted, one 70 in a fixed, the other 71 in an adjustable position. These cams cooperate with two arms 73 and 74 of a lever, where third arm 72 is attached to the rod 75 which forms the bottom of the rod 57, (Fig. 9). To permit such construction, the opening 66 has inserted therein an elbow 76, and the rod 75 passes through a stuffing box 77, but a loose one, as no pressure is present. (Fig. 5).

In Fig. 9 when the big valve rotates to close, the cone moves clockwise; to open the cone moves anti-clockwise. During the anti-clockwise opening movement, the adjustable cam 71 strikes the upper arm 73 and pushes it, the control valve rod 57 is thus pulled down and the cylinder 58 brought to its central or trapping position. This is as far as the rod will go, because the cam 71 thus reaches a dwell and arm 73 is pulled no further. Should, however, the water pressure be cut off, then the pressure on the piston 53 of the control valve will diminish and the spring will push the rod and it will go a further distance and will operate to close the valve completely. The described movement of the arms 73 and 74 is permitted as the fixed cam is cut away at that point.

In Fig. 8 there are shown some small corporation cocks 80 in the line. These and other fittings are always convenient for emergencies.

In Fig. 5, on top of the control valve is shown a hand wheel 81. This is for the purpose of manually pushing down the control valve cylinder whenever so desired to operate the big valve to close.

In the above description it has been stated that the socket 4 and the plug portion 8 are conical. Of course it is not necessary that they be conical. It is necessary that they both should be surfaces of revolution. The words cone and conical are here used as synonyms for surface of revolution, and for having the shape of a surface of revolution, respectively.

Attention is called to the fact that in the big valve the two motions, the lifting motion, and the opening motion, are both balanced. Both motions are non-parallel to the current, one is straight across, the other is a rotation across. In this regard the construction is different from that in some gate valves where a preliminary unseating motion is given parallel to the current, and where the water pressure opposes that movement.

Again attention is called to the fact that in the control valve the action is completely balanced, the water pressure in none of the four ways having any tendency to move the cylinder 58. Moreover, as each way surrounds the cylinder 58 there is no side thrust on it, thus leaving the cylinder operate with but little friction.

I am well aware that my big valve could be modified in construction and still function in the same way. Thus, instead of making the piston one piece with the plug and the cylinder one piece with the casing, these might be reversed. Again instead of making the piston both slide and turn in the cylinder an extra joint could be introduced so that the plug would turn in a sliding piston, or might slide in a turning piece.

These and similar changes I consider obvious modifications, and mention some of them to show that I have thought of them.

In the claims I speak of a passage and movement parallel or transverse thereto. By this I mean movement parallel to the direction of the flow along the passage, or transverse to the flow along the passage. A rotation about some axis is a movement non-parallel to the flow along the passage.

In the drawings the screw and nut are shown at the large end of the plug. They might be placed at the small end. In fact, there might be a screw and nut at each end.

I claim:

1. The combination of a main-valve having two opposed compartments fluid pressure in one of which opens the valve and fluid pressure in the other of which closes the valve, a control-valve having a first pressure chamber adapted to be connected to a source of fluid under pressure, a second chamber connected to said valve-opening compartment, and a third chamber connected to said valve-closing compartment, said control-valve having a movable member adapted to connect said first chamber to either said second or third chamber and to simultaneously connect the other chamber of the pair to the atmosphere, whereby said main-valve may be opened and closed by the entrance of fluid under pressure into either compartment and the simultaneous discharge of fluid from the other compartment to the atmosphere, means to automatically move said member to position to close said main-valve, and means to automatically move said member to position to open said main-valve an adjustable predetermined amount without interference with the action of said automatic closing means.

2. In a valve, the combination of a valve-casing having a conical valve-seat, a conical valve-plug cooperating with said seat, a piston on one end of said valve-plug, a cylinder in which said piston may slide, a piston on the opposite end of said valve-plug, a complementary cylinder in which said second piston may slide, a stationary member, a screw-threaded connection between said valve-plug and stationary member to cause a turning movement of said plug upon its axial movement, said pistons and cylinders acting as journals and bearings for said plug during such turning thereof, and means to control the entrance of a fluid into and its discharge from said cylinder, whereby to actuate said valve-plug.

3. In a valve, the combination of a valve-casing having a conical valve-seat, a conical valve-plug cooperating with said seat, a piston on one end of said valve-plug, a cylinder in which said piston may slide, a piston on the opposite end of said valve-plug, a complementary cylinder in which said second piston may slide, a stationary member, a screw-threaded connection between said valve-plug and said stationary member with play in such connection, to cause a turning movement of said plug upon its axial movement, said pistons and cylinders acting as journals and bearings for said plug during such turning thereof, and means to control the entrance of a fluid under pressure into and its discharge from said cylinders whereby to actuate said valve-plug, the play in said threaded connection causing said valve-plug during its opening movement to travel bodily axially only to free it from its valve-seat and then turn on its axis to open the valve passage.

4. In a valve, the combination of a valve-casing having a passage therethrough and a conical valve-seat, a conical valve-plug cooperating with said seat and having a passage therethrough adapted to be turned into and out of register with said casing passage, means to turn said valve-plug automatically to close the passage through the casing upon the occurrence of predetermined conditions, and means to open said valve-plug an adjustable amount without interfering with the operation of said automatic closing means.

5. In a valve, the combination of a valve-casing having a passage therethrough, a movable valve in said casing adapted to open and close said passage, Pitot tubes connected with the passage through said valve-casing on opposite sides of said valve, and means under the control of the fluid in said tubes to actuate said valve, the initiation of the opening of said valve being effected solely by the static pressure of the fluid in said valve-casing, the initiation of the closing of said valve being controlled substantially solely by the velocity of the fluid in said valve-casing.

6. In a valve, the combination of a valve-casing having a passage therethrough and a conical valve-seat, a conical valve-plug co-operating with said seat and having a passage therethrough adapted to be turned into and out of register with said casing passage, Pitot tubes connected with the passage through said valve-casing on opposite sides of said valve-plug, and means under the control of the fluid in said tubes to actuate said valve-plug, the initiation of the opening of said valve being effected solely by the static pressure of the fluid in said valve-casing, the initiation of the closing of said valve being controlled substantially solely by the velocity of the fluid in said valve-casing.

7. In a valve, the combination of a valve-casing having a passage therethrough and a conical valve-seat, a conical valve-plug cooperating with said seat and having a passage therethrough adapted to be turned into and out of register with said casing passage, Pitot tubes connected with the passage through said valve-casing on opposite sides of said valve-plug, and means under the control of the fluid in said tubes to actuate said valve-plug and in opening the valve to bodily move said plug first axially away from said valve-seat and then to turn the plug on its own axis, the reverse of said plug movements occurring during the closing action of the valve, the initiation of the opening of said valve being effected solely by the static pressure of the fluid in said valve-casing, the initiation of the closing of said valve being controlled substantially solely by the velocity of the fluid in said valve-casing.

8. In a valve, the combination of a valve-casing having a passage therethrough, a movable valve in said casing adapted to open and close said passage, a Pitot tube connected with the passage through said valve-casing on one side of said valve, a tube connected with the passage through said valve-casing at the opposite side of said valve, and means under the control of the fluid in said tubes to actuate said valve, the initiation of the opening of said valve being effected solely by the static pressure of the fluid in said valve-casing, the inauguration of the closing of said valve being controlled substantially solely by the velocity of the fluid in said valve-casing.

In testimony whereof I have signed my name to this specification this 20th day of May, 1926, at Chicago, Illinois.

DAVID D. GOLDBERG.